United States Patent
Addison et al.

(10) Patent No.: US 9,594,722 B2
(45) Date of Patent: Mar. 14, 2017

(54) SYSTEM PROVISIONING OPTIMIZATION

(71) Applicant: International Business Machines Corporation, Armonk, NY (US)

(72) Inventors: Stewart Addison, Eastleigh (GB); David A. Barnes, Hursley (GB); Edwin P. J. Moffatt, Hursley (GB); Richard Postlethwaite, Salisbury (GB)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 14/044,244

(22) Filed: Oct. 2, 2013

(65) Prior Publication Data
US 2014/0095680 A1  Apr. 3, 2014

(30) Foreign Application Priority Data
Oct. 2, 2012  (GB) .................................. 1217571.7

(51) Int. Cl.
G06F 15/16 (2006.01)
G06F 15/177 (2006.01)
G06F 9/50 (2006.01)
H04L 12/24 (2006.01)

(52) U.S. Cl.
CPC .......... G06F 15/177 (2013.01); G06F 9/5027 (2013.01); G06F 9/5061 (2013.01); G06F 9/5072 (2013.01); H04L 41/50 (2013.01); G06F 2209/5011 (2013.01)

(58) Field of Classification Search
CPC ........ G06F 9/5027; G06F 9/50; G06F 9/5005; G06F 9/5011; G06F 9/5072; G06F 2209/501

USPC .................................. 709/223, 224, 226, 222
See application file for complete search history.

(56) References Cited

U.S. PATENT DOCUMENTS

| 7,698,704 B2 | 4/2010 | Abali et al. | |
| 7,979,859 B2 | 7/2011 | Li et al. | |
| 8,037,475 B1 * | 10/2011 | Jackson | G06F 9/5027 709/224 |
| 8,145,765 B2 | 3/2012 | Swildens et al. | |
| 8,775,438 B1 * | 7/2014 | Brooker | G06F 9/5027 707/748 |
| 8,966,037 B1 * | 2/2015 | Carr | G06F 11/076 709/223 |
| 2003/0217101 A1 | 11/2003 | Sinn | |

(Continued)

OTHER PUBLICATIONS

Lee et al., "Automating OS/SW Provisioning for Building Enterprise Data Center," Proceedings of the 13th International Conference on Advanced Communication Technology (ICACT 2011), Feb. 2011, pp. 859-862.

(Continued)

*Primary Examiner* — David Lazaro
(74) *Attorney, Agent, or Firm* — Yee & Associates, P.C.; Stephen R. Yoder

(57) ABSTRACT

A method, system and program product for optimizing of the provisioning of systems. The method, system, computer program product for provisioning a system comprises steps of intercepting a request to provision a named system; calculating a number of named systems needed to give an overall provisioning success rate higher than a threshold success rate; and requesting parallel provisioning of the calculated number of named systems.

10 Claims, 15 Drawing Sheets

(56) References Cited

U.S. PATENT DOCUMENTS

| | | | |
|---|---|---|---|
| 2008/0077680 A1* | 3/2008 | Dellarole | G06F 9/5038 709/220 |
| 2009/0307699 A1* | 12/2009 | Munshi | G06F 9/4843 718/102 |
| 2010/0281489 A1* | 11/2010 | Lee | G06F 9/5038 718/106 |
| 2011/0239212 A1 | 9/2011 | Wookey | |
| 2012/0102487 A1 | 4/2012 | Cahill et al. | |
| 2013/0117168 A1* | 5/2013 | Sandstrom | G06Q 30/0283 705/34 |
| 2014/0181828 A1* | 6/2014 | Bird | G06F 9/5016 718/103 |
| 2014/0215080 A1* | 7/2014 | Alabiso | H04L 47/70 709/226 |
| 2014/0280441 A1* | 9/2014 | Jacobson | G06F 9/5027 709/201 |

OTHER PUBLICATIONS

Agarwalla et al., "Automating Provisioning of Complete Software Stack in a Grid Environment," Georgia Institute of Technology Technical Report, Jul. 2004, 18 pages.

GB Search Report, dated Jan. 29, 2013, regarding Application No. GB1217571.7, 3 pages.

* cited by examiner

Figure 5

| Provisioning Reliability Repository 500 | | | | |
|---|---|---|---|---|
| System | Success | Failure | Updated | Failure Rate |
| 123 | 100 | 25 | 0 | 25% |
| 1234 | 50 | 25 | 1 | 30% |
| 235 | 20 | 16 | 0 | 80% |

Figure 6A

| Provisioning Optimizer 300 | |
|---|---|
| System Register 302 | 123 |
| Quantity Register 304 | 1 |
| Failure Rate Register 306 | 25% |
| Success Rate Register 308 | 75% |
| Threshold Register 309 | 90% |

Figure 6B

| Provisioning Optimizer 300 | |
|---|---|
| System Register 302 | 123 |
| Quantity Register 304 | 2 |
| Failure Rate Register 306 | 6.25% |
| Success Rate Register 308 | 93.75% |
| Threshold Register 309 | 95% |

Figure 6C

| Provisioning Optimizer 300 | |
|---|---|
| System Register 302 | 123 |
| Quantity Register 304 | 3 |
| Failure Rate Register 306 | 1.56% |
| Success Rate Register 308 | 98.44% |
| Threshold Register 309 | 95% |

SYSTEM PROVISIONING OPTIMIZATION

CROSS-REFERENCE TO RELATED APPLICATION

This Application claims the benefit of priority to United Kingdom Patent Application Serial No. 1217571.7, filed on Oct. 2, 2012, the contents of which are hereby incorporated by reference.

FIELD OF THE INVENTION

This invention relates to a method and apparatus for optimizing of the provisioning of systems.

BACKGROUND

In an automated provisioning system, machines are provisioned 'on demand'. Essentially, a user requests a system be provisioned from a pool of available resource by submitting system requirements; if there is suitable resource available in the pool then this resource is provisioned for them. When the user is finished with the provision, it is de-provisioned and returned to the pool for re-use.

How the overall resources of an IT organization are divided up into pools is a matter of choice, but one common example is to have one pool per development team.

A major factor that introduces delays and decreases the agility of a provisioning system (an important characteristic) is the time taken from a provision request through to the machine being made available to the user. This can be because the initial (and subsequent) install might fail. Factors that could cause a failure include hardware or network failures, so it is often the case that a job failing on one machine does not mean it will fail on the next machine. A current solution is to automatically start another provision after the first one fails, but the problem with this is that it adds considerably to the time taken for the machine to be available to the user.

BRIEF SUMMARY OF THE INVENTION

In a first aspect of the invention there is provided a method as described in claim a method of provisioning a system comprising: intercepting a request to provision a named system; calculating the number of named systems needed to give an overall provisioning success rate higher than a threshold success rate; and requesting parallel provisioning of the calculated number of named systems.

The embodiments use historical data from the provisioning system to calculate the known failure rate for the named system being provisioned and initiate a suitable number of provisions in parallel to target a sufficiently high threshold success rate (also known as a percentage chance or percentage change rate (PCR), for example, more than 95%). Thereby at least one system would provision successfully within a standard provisioning time frame. A user would receive the first system to complete successfully.

The benefit of the embodiments is that the user will receive a provisioned machine within a shorter time frame with parallel provisioning and not have to wait for multiple sequential provisions to complete before a usable system is available.

A provisioning server external to the embodiments is made to operate in a new way because the embodiments change the normal sequential provisioning operation of the provisioning server to a parallel provisioning operation.

The embodiments have a speeding up effect on the overall provisioning service provided to the user because parallel provisioning has a greater chance of delivering a functioning provisioned service then sequential provisioning.

The embodiments have an increased reliability effect on the overall provisioning service provided to the user because parallel provisioning has a greater chance of delivering a functioning provisioned service than sequential provisioning.

Advantageously the threshold success rate depends on the type of named system or depends on the pool from where the named system is stored.

An advantage of having different thresholds for different pools or system types is that some pools or systems can be marked as high priority. When a priority provision is started off it needs to complete quicker than a regular provision. A low priority provision can take longer than a regular provision and a lowest priority provision may only trigger a single provision. As such, environmental and utilisation issues can be managed against business requirements.

More advantageously, when a first provisioning process of a family of related provisioning processes is successful then other processes in the family are redundant and other processes in the family that are still in progress are shut down. All objects related to the shut down provisioning processes are removed or marked for removal.

Even more advantageously a first provisioning process of a family of related provisioning processes is successful then other processes in the family are redundant but allowed to progress so that process can be monitored for failure rate.

In a second aspect of the invention there is provided a system as described in claim 5.

In a third aspect of the invention there is provided a computer program product for provisioning a system, the computer program product comprising a computer-readable storage medium having computer-readable program code embodied therewith, the computer-readable program code configured to perform the method of any one of claims 1 to 4.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a digital computer, comprising software code portions, when said program is run on a computer, for performing the claimed methods.

In a fifth aspect of the invention there is provided a data carrier comprising functional computer data structures to enable, when loaded into a computer system and operated upon thereby, said computer system to perform all the steps of the claimed methods. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which:

FIG. 5 is a data diagram of the preferred embodiment;

FIG. 6A to 6C are state diagrams of an example of the preferred embodiment;

DETAILED DESCRIPTION OF THE EMBODIMENTS

Figure 1:
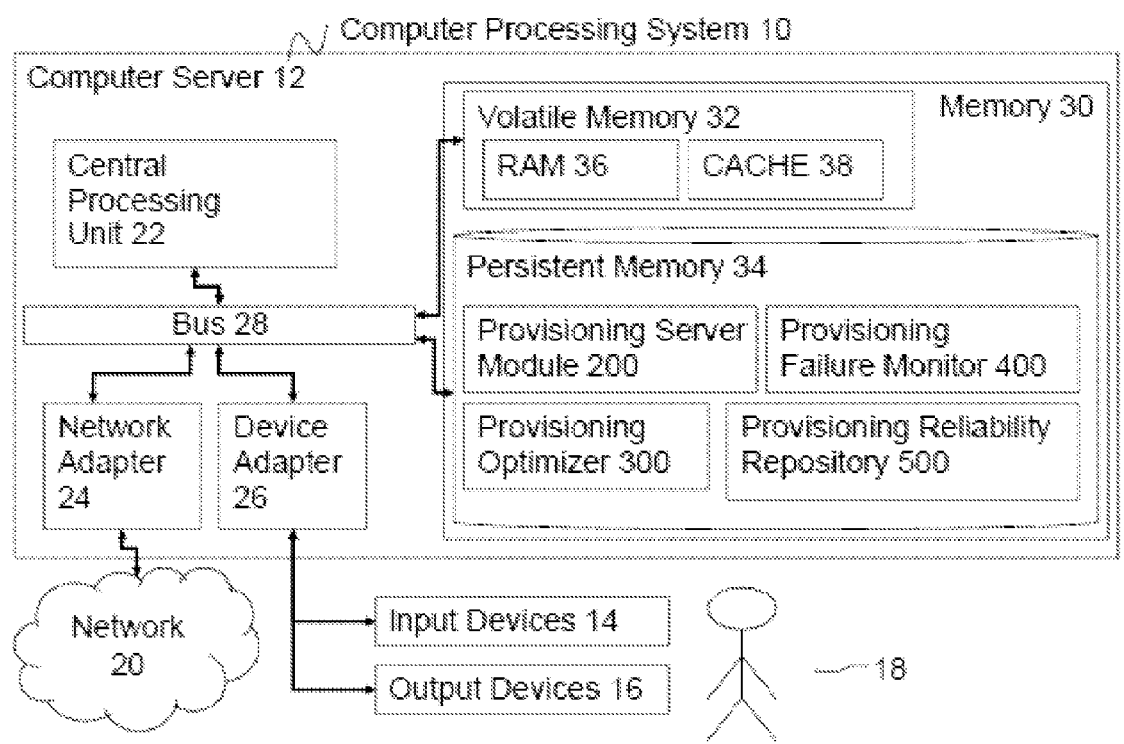
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises computer server 12 and one or more input devices 14 and output devices 16 directly attached to the computer server 12. Computer processing system communicates with a user 18 using input devices 14 and output devices 16. Input devices 14 include one or more of: a keyboard, a scanner, a mouse, trackball or another pointing device. Output devices 16 include one or more of a display or a printer. Computer processing system communicates with network devices (not shown) over network 20. Network 20 can be a local area network (LAN), a wide area network (WAN), or the Internet.

Computer server 12 comprises the following components: central processing unit (CPU) 22, network adapter 24; device adapter 26; bus 28 and memory 30.

CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A set of machine instructions is called a machine code program, the machine instructions are written in a machine code language which is referred to a low level language. One type of machine code program is a virtual machine that interprets virtual machine code into the underlying machine code. Such virtual machine code is typically has a higher level of abstraction than the underlying machine code language. Alternatively a virtual machine code program can be complied into a machine code program.

Network adapter 24 is connected to bus 28 and network 20 for enabling communication between the computer server 12 and network devices.

Device adapter 26 is connected to bus 28 and input devices 14 and output devices 16 for enabling communication between computer server 20 and input devices 14 and output devices 16.

Bus 28 couples the main system components together. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

In the preferred embodiment, the set of program modules configured to carry out the functions of the embodiments comprise: provisioning server module 200; provisioning failure module 300; provisioning optimizer 400; and provisioning reliability repository 500. Further program modules that support the preferred embodiment but are not shown including firmware, boot strap program, operating system, and support applications. Each of the operating system, support applications, other program modules, and program data or some combination thereof, may include an implementation of a networking environment.

It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
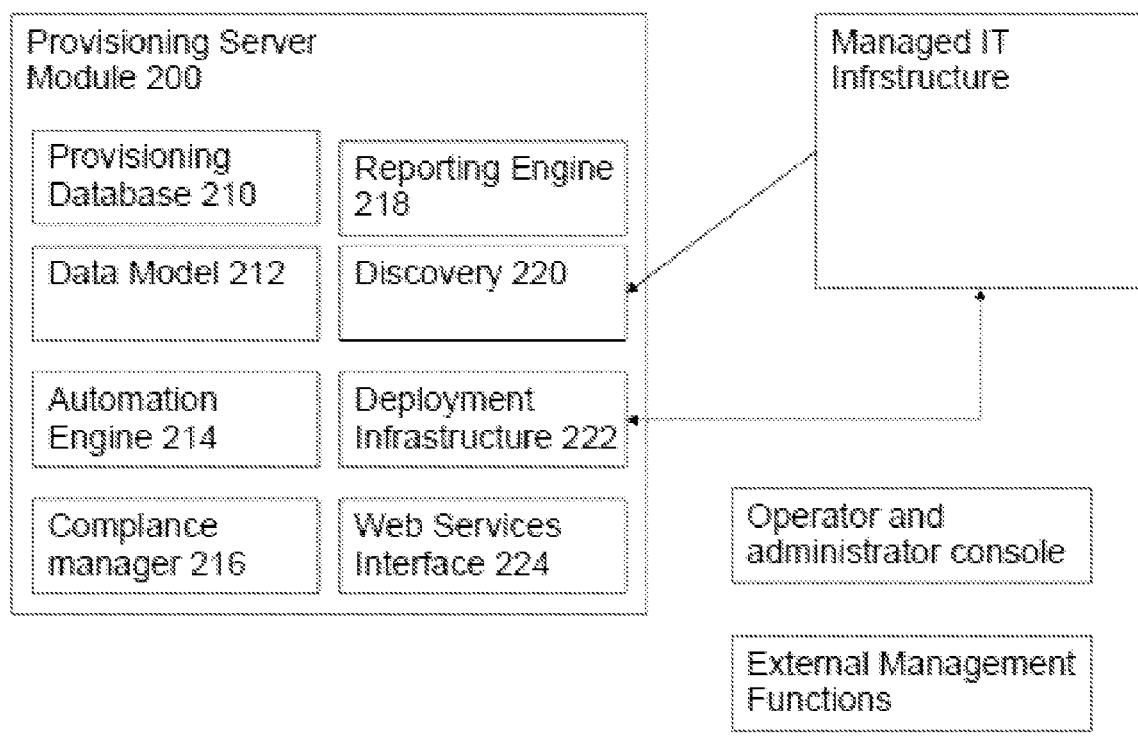
FIG. 2 is a component diagram of a prior art provisioning server.

Referring to FIG. 2, the components of provisioning server module 200 are described in the context of managed information technology (IT) infrastructure 202 and an operator and an administrator console 204.

Managed IT infrastructure 202 is a system of resources that has already been provisioned by an executing provisioning server or is part of the environment that provisioned resources will exist in.

Operator and administrator console 204 allows a user to interact with the provisioning server when in operation. Operator and administrator console 202 provides a graphical representation of the IT assets, includes wizards to simplify configuration, and other features such as reporting and task status tracking that are not available from the command-line interface.

Provisioning server module 200 comprises: provisioning database 210; data model 212; automation engine 214; compliance manager 216; reporting engine 218; discovery engine 220; deployment infrastructure engine 222; and web services interface 224. Provisioning server module 200 is based on IBM Tivoli Provisioning Manager v5.1.1. IBM and Tivoli are registered trademarks of International Business Machines in the US and other countries.

Provisioning database 210 is the physical database for provisioning server 200. The provisioning database holds the data model.

Data model 212 is a representation of all of the physical and logical assets that the provisioning server manages, such as computers, switches, load balancers, application software, VLANs, and security policies. It keeps track of the hardware and associated allocations to applications, as well as changes to configuration. When a workflow successfully completes a requested change, the data model is updated to reflect the current infrastructure. The data model also stores information about allocated and unallocated servers in resource pools for tier management. This information can include server identifiers, resource pool size, active and idle server numbers and server priority. Discovery engine 220 and automation engine 214 also use the data model to identify configuration changes that are made outside of the provisioning server 200. A user can review changes in provisioning database 210 and use the change information to restore an asset to a previously known state.

Automation engine 214 is a collection of workflows, scripts, and other commands and tools that apply to the operation of a specific type of software component or a physical device. Deployment infrastructure engine 222 manages the deployment of workflows and associated components in using the automation engine 214. Automation engine 214 automates the provisioning of software, patches, images and operating systems, and devices, including servers, network devices, and storage.

Compliance manager 216 allows a user to examine the software and security set up you have on a target computer (or group of computers) in a managed infrastructure and then compare that set up to the desired set up in order to determine if they match. If they do not match, noncompliance occurs, and recommendations (remediation) on how to fix the noncompliance issues are generated.

Reporting engine 218 allows a user to retrieve current information about enterprise inventory, activity, and system compliance. Reporting functionality includes: predefined reports; a Web-based query builder, which allows a user to customize existing reports or create new reports; access to information in the data model through high-performance views; simple sharing of report definitions through enhanced import and export capabilities in the Web interface; charts and graphs; an ability to schedule reports to run at a later time including repeating intervals; e-mail report distribution and notification; and integration with third-party reporting software.

Discovery engine 220 provides automated processes for allowing a user to find resources, as well as any changes to existing resources, within an enterprise or managed IT infrastructure. Discovery engine 222 provides the following discovery technologies: discovery of computers by organizational unit, directory groups, and computer attributes; discovery of computers, their hostname and networking information, as well as new devices and modifications of existing Tivoli Provisioning Manager managed devices; discovery of configuration changes and discovery of hardware and/or software on devices.

Deployment infrastructure engine 222 supports reconfiguring and reallocation of resources in your managed environment using three different deployment infrastructures: a scalable distribution infrastructure, the Tivoli Management Framework infrastructure, and a deployment engine infrastructure.

Web Services interface 224 provides for direct user access to the data model directly rather than launching a Web interface. Using the Web Services a user can access, manipulate, or change objects directly in the data model.

Figure 3A:
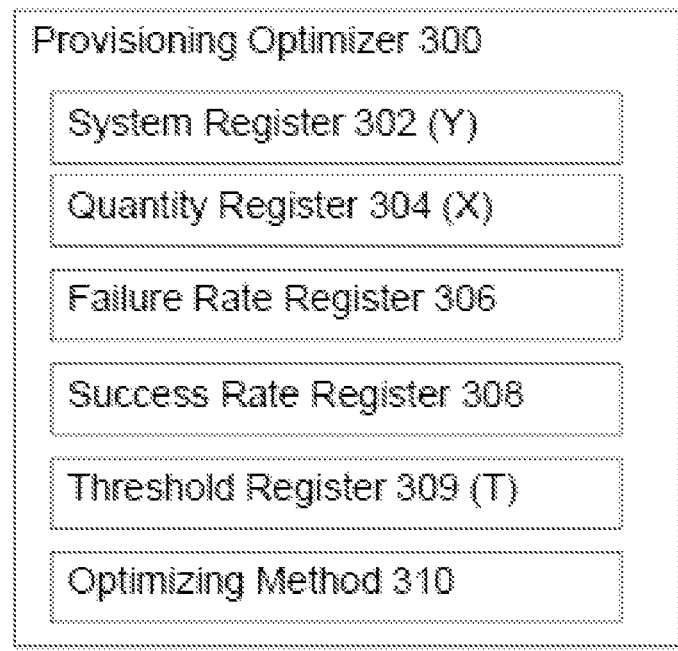
FIG. 3A to 3C are component and process diagrams of a provisioning optimizer of the present embodiment.

Referring to FIG. 3, provisioning optimizer 300 comprises: system register 302; quantity register 304; failure rate register 306; success rate register 308; threshold register 309; and optimizing method 310.

System register 302 is for storing the name of the system to be provisioned.

Quantity register 304 is for initially storing the number (integer variable X) of systems requested to be provisioned. The default number is one but it would be possible to optimize provisioning for more than one system. In this embodiment, this register (and therefore X) is incremented to find the final number of systems to be provisioned.

Failure rate register 306 is for storing the located value for the historical failure rate of the system to be provisioned. Initially, if more than one system is requested then the failure rate register 306 is for storing the overall failure rate of the systems calculated from the historical failure rate of that type of system.

Success rate register 308 is for storing the overall success rate for a number X of systems as calculated by the optimizing method 310.

Threshold register 309 is for storing a predetermined threshold value T used to compare against the success rate.

Optimizing method 310 is for calculating the number of provisioning systems needed to increase the success rate to more than the threshold value.

Figure 3B:
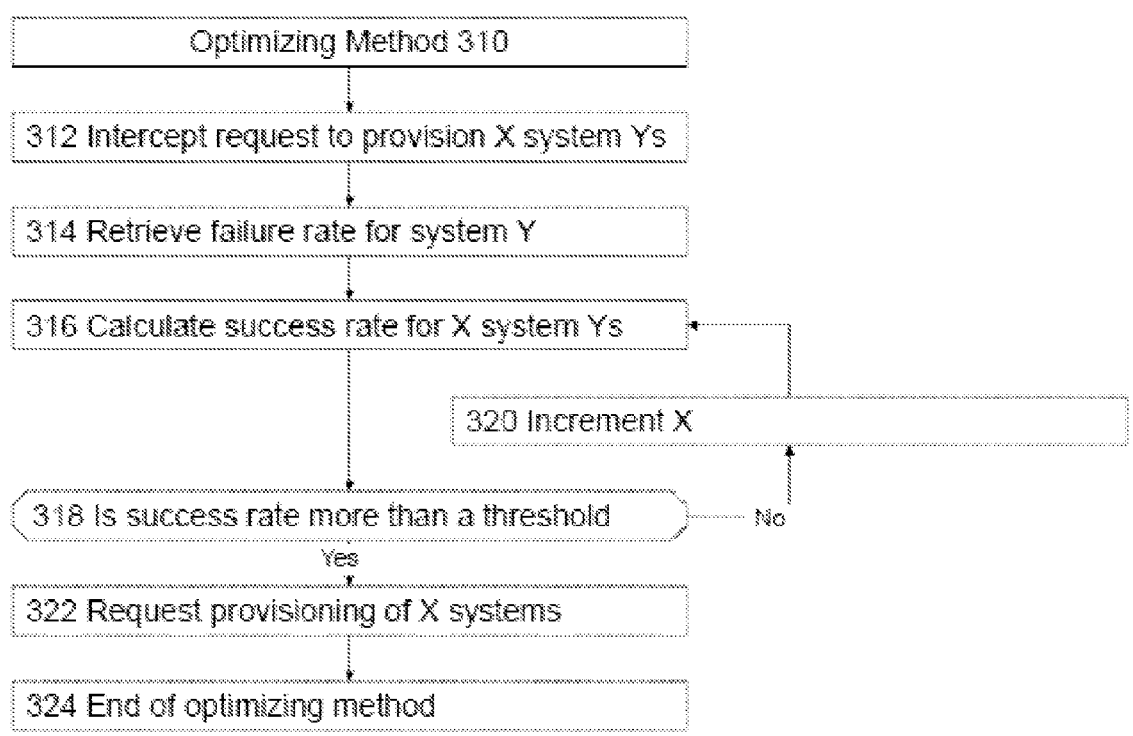

Referring to FIG. 3B, optimizing method 310 comprises logical process steps 312 to 324.

Step 312 is for intercepting request to provision X number of system Y where X is stored in quantity register 304 and Y is stored in system register 302.

Step 314 is for retrieving a failure rate for system Y from provisioning reliability data 500.

Step 316 is for calculating a success rate for quantity X of system Y. In the preferred embodiment a call is made to success rate sub-method 316.2 described in more detail with respect to FIG. 3C.

Step 318 is for determining if the calculated success rate is more than a threshold and progress the process to completion at step 322. Else step 320

Step 320 is for incrementing X.

Step 322 is for request provisioning of X systems.

Step 324 is the end of optimizing method 300.

Figure 3C:
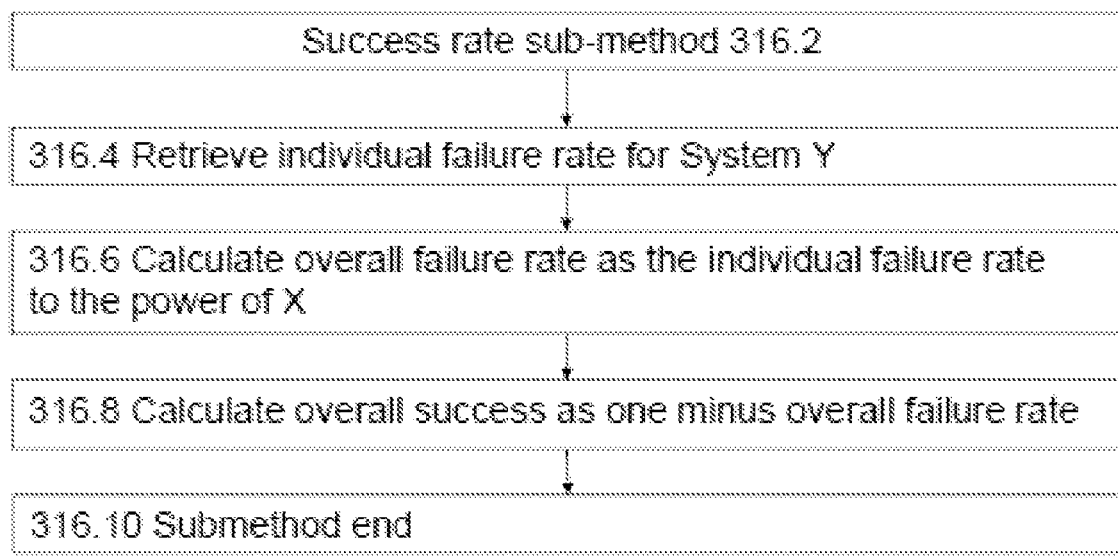

Referring to FIG. 3C, success rate sub-method 316.2 comprises logical process steps 316.4 to 316.10.

Step 316.4 is for retrieving individual failure rate for System Y.

Step 316.6 is for calculating overall failure rate as the individual failure rate to the power of X.

Step 316.8 is for calculating overall success as one minus overall failure rate.

Step 316.10 is the end of the sub-method and control is returned to the calling method.

Figure 4A:
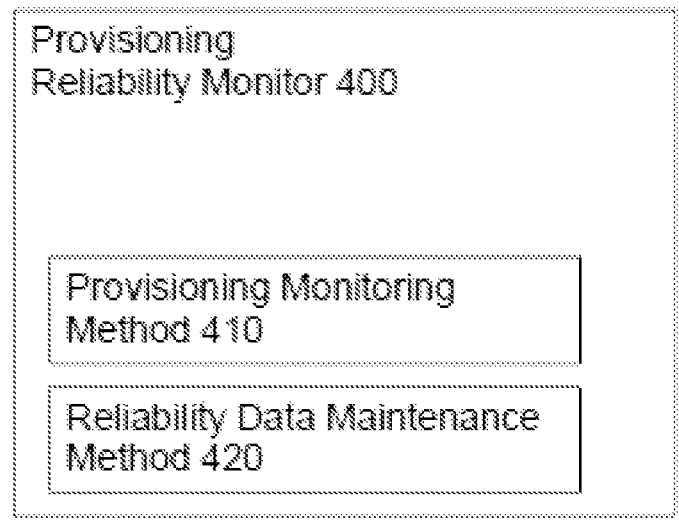
FIG. 4A to 4C are component and process diagrams of a provisioning reliability monitor of the present embodiment.

Referring to FIG. 4A, provisioning reliability monitor 400 comprises: provisioning monitoring method 410 and reliability data maintenance method 420.

Provisioning monitoring method 410 is for monitoring the status of provisioning jobs performed by provisioning server module 200 and is described in more detail with reference to FIG. 4B.

Reliability data maintenance method 420 is for monitoring the status of the provisioning system records and updating the failure records when required. This method is described in more detail with reference to FIG. 4C.

Figure 4B:
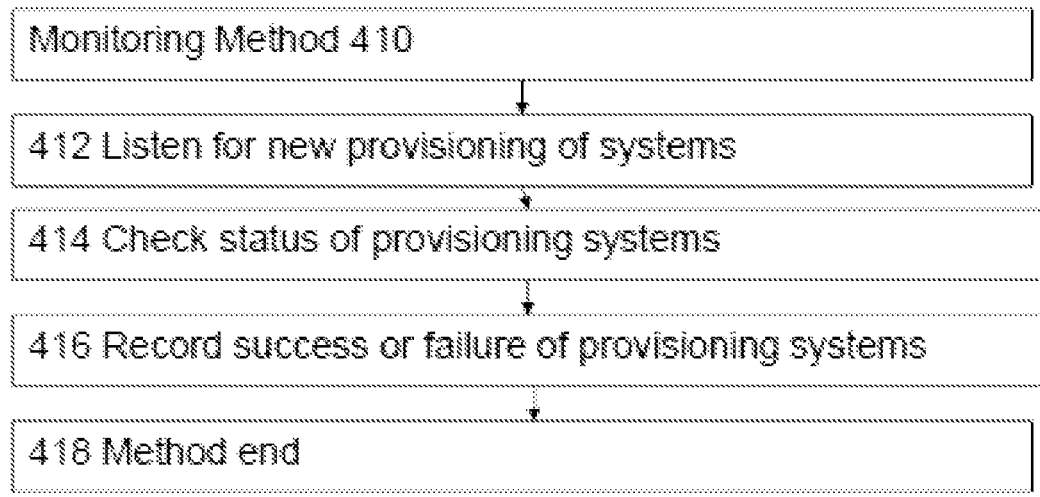

Referring to FIG. 4B, monitoring method 410 comprises logical process steps 412 to 418.

Step 412 is for listening for initiation of a provisioning request and registering the name of the system in an in-progress provisioning list Z.

Step 414 is for checking the status of each of the in progress provisioning systems list Z Step 416 is for recording success or failure of the in-progress provisioning systems in the provisioning reliability repository 500.

Step 418 is the end of method end.

Figure 4C:
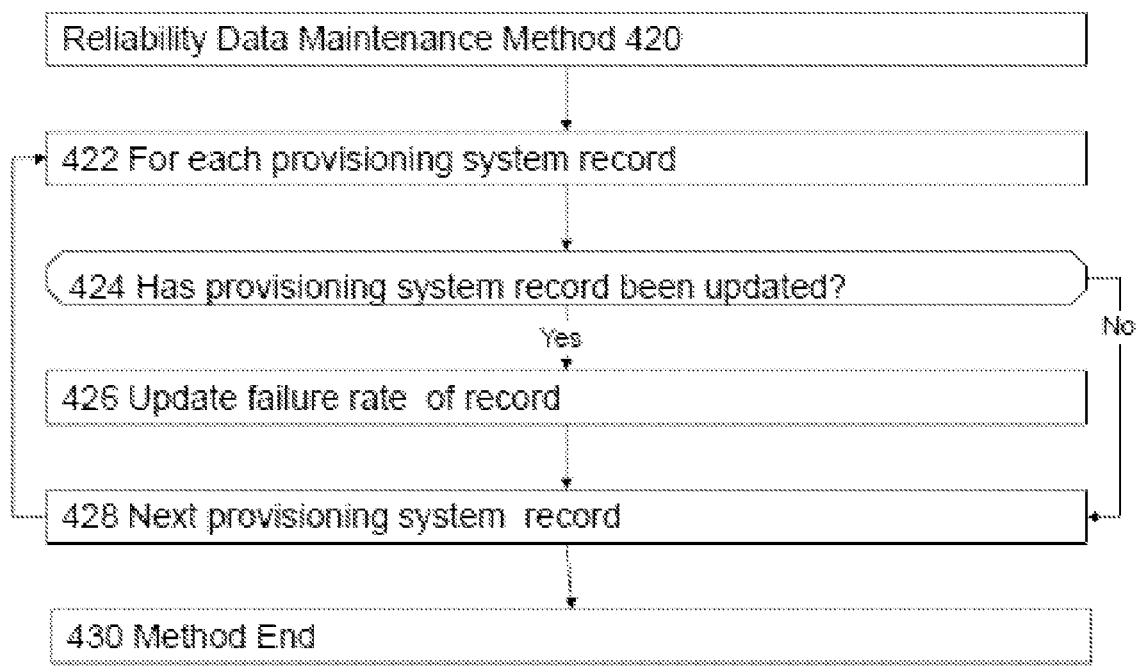

Referring to FIG. 4C, reliability data maintenance method 420 comprises logical process steps 422 to 430.

Step 422 is for defining a look for each provisioning system record in the provisioning reliability repository 500.

Step 424 is for determining if a provisioning system record has been updated and for progressing to step 426 is true. Otherwise the method continues at step 428.

Step 426 is for updating failure rate of record with the updated success or fail data.

Step 428 is for returning to step 422 for the next provisioning system record and then step 424. If there is no next provisioning record then the method continues at step 430.

Step 430 is the end of the method.

Referring to FIG. 5, provisioning reliability repository 500 comprises a table for provisioning records. Each record comprises the following fields: system; success; failure; updated; and failure rate. Each field represents a column in the table and each row in the table represents a provisioning record.

The system field is for storing the name of a provisioning system that is or has been monitored. A new provisioning system is added by monitoring method 410. Existing provisioning systems are updated by monitoring method 410. The example systems comprise: System 123; System 1234; and System 235. The references highlight that a system comprises a number of resources, for example, resource 1, resource 2 and resource 3.

The success field is for recording the number of provisioning successes. Monitoring method 410 increments the success field on success of a monitored provision.

The failure field is for recording the number of provisioning failures. Monitoring method 410 increments the failure field on failure of a monitored provision.

The updated field is for recording when a success or failure field has been updated. Monitoring method 410 increments the updated field after incrementing the success or failure field.

The failure rate field is for recording the failure rate of each provisioning system. Reliability data maintenance method 420 updates the failure rate field periodically (for example once a day) after the update field has been set. The success and failures fields can accumulate or be reset to zero depending on the preference of the embodiment.

For example, System 123 has 100 success and 25 failures and a failure rate of 25% calculated by dividing 25 failures by 100 successes. System 1234 has a recorded failure rate of 30% but its updated field is set, an updated failure rate would be 50% (25 failures divided by 50 successes). System 235 has a failure rate of 80% (16 failures divided by 20 successes).

Referring to FIGS. 6A to 6C, states of the provisioning optimizer are shown for three iterations of an example of provisioning example System 123.

Referring to FIG. 6A, one requested system for provisioning is '123' stored in system register 302 and quantity '1' is stored in quantity register 304. A 25% failure rate for system 123 is retrieved from provisioning reliability repository 500 (see example in FIG. 5). Optimizing method 310 calculates a success rate of 75% and stores the success rate in success rate register 308. Since a 75% success rate is not more than the 90% threshold stored in threshold the optimizing method 310 repeats.

Referring to FIG. 6B, optimizing method 310 increments the quantity register 304 to '2', calculates an overall failure rate 6.25% as the single failure rate to the power of '2' and stores this in the failure rate register 306. Optimizing method 310 calculates a success rate of 93.75% and stores the value in success rate register 308. Since a 93.75% success rate is not more than the 95% threshold stored in threshold register 309 the optimizing method 310 repeats.

Referring to FIG. 6C, optimizing method 310 increments the quantity register 304 to three, calculates an overall failure rate 1.56% as the single failure rate to the power of three and stores this in the failure rate register 306. Optimizing method 310 calculates a success rate of 98.44% and stores the value in success rate register 308. Since a 98.44% success rate is more than the 95% threshold stored in threshold register 309, the optimizing method 310 has determined three as the required number of system 123 to be provisioned as stored in the quantity register. Optimizing method 310 requests provisioning server module 200 to provision three system 123s in parallel.

Figure 7A:
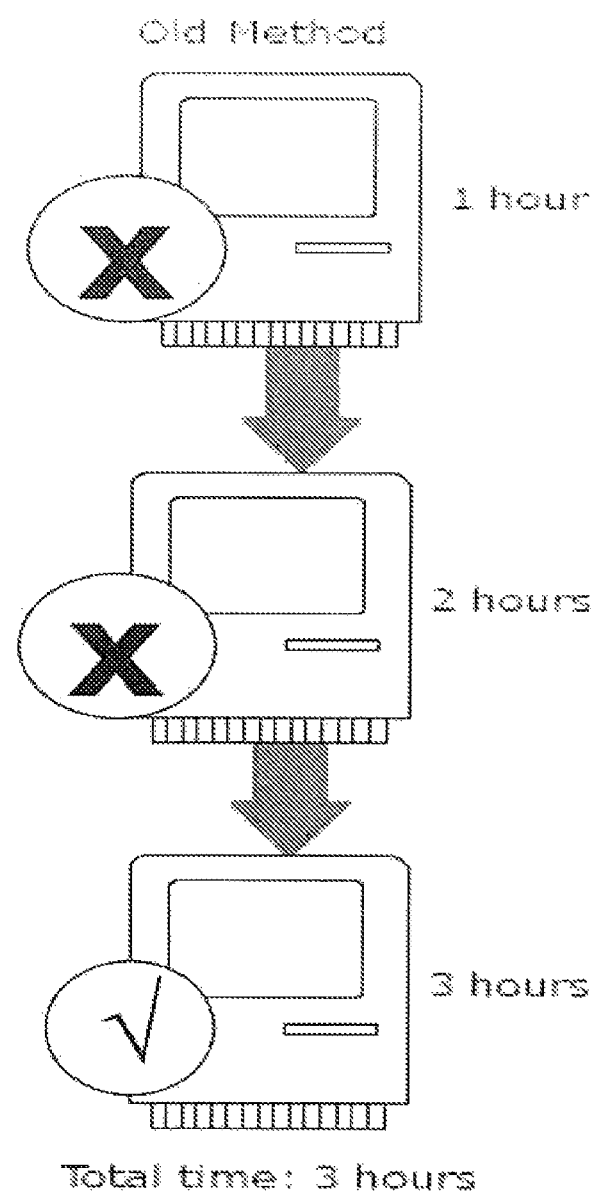
FIGS. 7A and 7B are state diagrams comparing the prior art with an embodiment.

Referring to FIG. 7A, three sequential provisionings of the same system are shown with each provisioning taking an hour. When the first and second provisioning processes fail and the third provisioning succeeds, as shown, the whole process takes three hours.

Figure 7B:
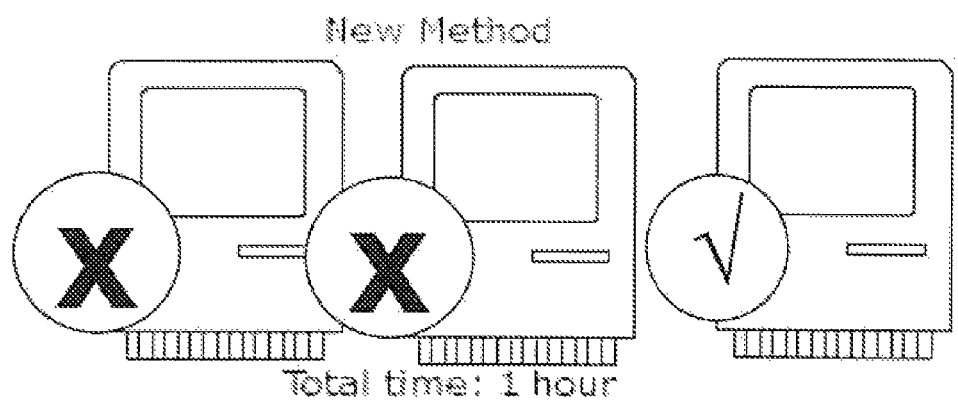

Referring to FIG. 7B, three parallel provisionings of the same system are shown with the whole provisioning taking an hour. The first and second provisioning process fail and the third provisioning succeeds, as shown, so the result of the provisioning is the same as in FIG. 7A but a successful provisioning takes a much shorter time.

Further embodiments of the invention are now described.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively embodied fully or partially in a parallel computing system comprising two or more processors for executing parallel software.

Figure 8:
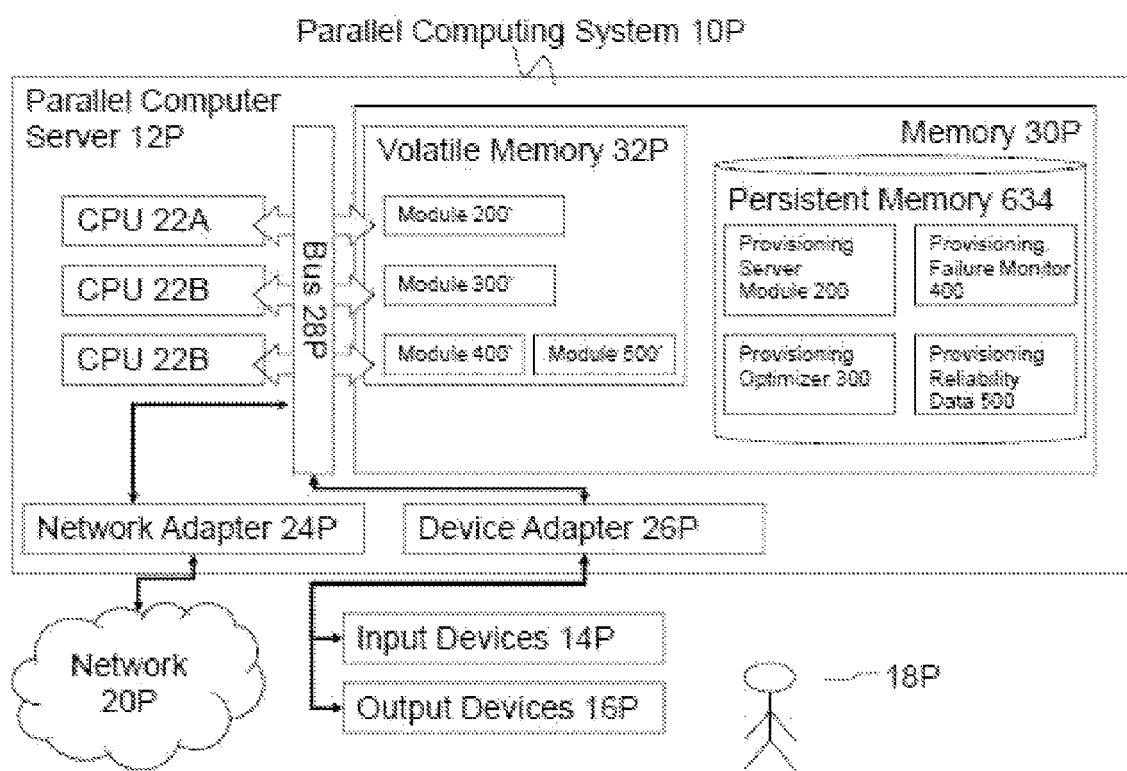
FIG. 8 is a deployment diagram of a parallel computing embodiment.

Referring to FIG. 8, an example parallel computing embodiment may be described in the general context of parallel computer system executable instructions, such as parallel program modules, being executed by parallel computing system 10P. Generally, parallel program modules may include routines, programs, objects, components, logic, data structures, that perform particular tasks or implement particular abstract data types. Parallel computing system 10P comprises: parallel computer server 12P; input devices 14P and output devices 16P. Parallel computing system 10P communicates with user 18P via input devices 14P and output devices 16P. User 18P provides input and receives output from the parallel computing system 10P but is not part of parallel computing system 10P.

Parallel computing system 10P communicates with network devices (not shown) over network 20P.

Parallel computer server 12P comprises: CPU 22A, CPU 22B; network adapter 24P; device adapter 26P; bus 28P and memory 30P.

Device adapter 26P provides the gateway between the parallel computer server 12P and input devices 14P and output devices 16P.

Bus 28P represents one or more of any of several types of bus structures, including a memory bus or memory controller, a peripheral bus, an accelerated graphics port, and a processor or local bus using any of a variety of bus architectures.

Memory 30P includes computer system readable media in the form of volatile memory 32P and non-volatile or persistent memory 34P.

In the parallel computing embodiment, program modules comprise: persistent server modules 200'; provisioning optimizer 300'; provisioning failure monitor 400'; and provisioning reliability repository 500'. Modules are stored in persistent memory 34P, by way of example and not limitation, as well as an operating system, one or more application programs, a database management system and other program modules. Each of the operating system, one or more application programs, other program modules, and program data or some combination thereof, may include an implementation of a networking environment. Modules 200', 300', 400' and 500' are provided to carry out the functions and/or methodologies of the embodiments in a parallel environment as described herein.

Modules 200', 300' and 400' are autonomous parts of the embodiment. In operation, these parts are extracted from persistent memory 34P and loaded into volatile memory 32P as executable modules 200", 300", 400" and 500" so that they may be executed separately and therefore in parallel by CPU 22A, CPU 22B and CPU 22C.

In this example, three CPUs are shown but any number of CPUs could be used to build alternative parallel embodiments. In this example, three separate CPUs are used but a single processing unit having multiple cores could be used to build an alternative embodiment. In this example, the CPUs are physical CPUs but a computer server comprising a virtual computing environment and virtual parallel processing units could be used to build a virtual parallel computing embodiment. Further embodiments can comprises combinations of: real processing units; real processing unit cores; virtual processing units; and virtual parallel processing cores.

It will be clear to one skilled in the art that many improvements and modifications can be made to the foregoing exemplary embodiment without departing from the scope of the present invention.

The invention claimed is:

1. A method of provisioning a system, comprising steps of:
   intercepting, by a provisioning server, a request to provision a named system;
   calculating, by the provisioning server, a number of named systems of a managed information technology (IT) infrastructure that are needed to give an overall provisioning success rate higher than a threshold success rate; and
   requesting, by the provisioning server, parallel provisioning of the calculated number of named systems of the managed IT infrastructure.

2. A method according to claim 1 whereby the threshold success rate depends on the type of named system or depends on the pool from where the named system is stored.

3. A method according to claim 1 whereby when a first provisioning process of a family of related provisioning processes is successful, then other processes in the family are redundant and other processes in the family that are still in progress are shut down, and objects related to the shutdown provisioning processes are removed or marked for removal.

4. A method according to claim 1 whereby when a first provisioning process of a family of related provisioning processes is successful, then other processes in the family are redundant but allowed to progress so that process can be monitored for failure rate.

5. A computer program product for provisioning a system, the computer program product comprising a non-transitory computer-readable storage medium having computer-readable program code embodied therewith, the computer-readable program code configured to perform the method of claim 1.

6. A computer program stored on a non-transitory computer readable medium and loadable into the internal memory of a digital computer, the computer program comprising software code portions that are operable, when said computer program is run on the digital computer, for performing the method of claim 1.

7. A provisioning system comprising:
an interceptor interface, implemented on a computer server of the provisioning system, configured to intercept a request to provision a named system;
an arithmetic engine, of the provisioning system, configured to calculate a number of named systems of a managed information technology (IT) infrastructure that are needed to give an overall provisioning success rate higher than a threshold success rate; and
a message interface, of the provisioning system, configured to request parallel provisioning of the calculated number of named systems of the managed IT infrastructure.

8. A system according to claim 7 whereby the threshold success rate depends on the type of named system or depends on the pool from where the named system is stored.

9. A system according to claim 7 whereby when a first provisioning process of a family of related provisioning processes is successful, then other processes in the family are redundant and other processes in the family that are still in progress are shut down and all objects related to the shutdown provisioning processes are removed or marked for removal.

10. A system according to claim 7 whereby when a first provisioning process of a family of related provisioning processes is successful, then other processes in the family are redundant but allowed to progress so that process can be monitored for failure rate.

* * * * *